(12) United States Patent
Ai et al.

(10) Patent No.: US 11,835,808 B2
(45) Date of Patent: Dec. 5, 2023

(54) ARRAY SUBSTRATE, DISPLAY PANEL, AND ELECTRONIC DEVICE

(71) Applicant: WUHAN CHINA STAR OPTOELECTRONICS TECHNOLOGY CO., LTD., Wuhan (CN)

(72) Inventors: Fei Ai, Wuhan (CN); Jiyue Song, Wuhan (CN); Dewei Song, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 433 days.

(21) Appl. No.: 17/051,929

(22) PCT Filed: Aug. 5, 2020

(86) PCT No.: PCT/CN2020/107153
§ 371 (c)(1),
(2) Date: Oct. 30, 2020

(87) PCT Pub. No.: WO2022/016620
PCT Pub. Date: Jan. 27, 2022

(65) Prior Publication Data
US 2023/0094760 A1 Mar. 30, 2023

(30) Foreign Application Priority Data
Jul. 23, 2020 (CN) .......................... 202010715882.5

(51) Int. Cl.
G02F 1/1333 (2006.01)
G02F 1/1343 (2006.01)
G02F 1/1368 (2006.01)

(52) U.S. Cl.
CPC ........ G02F 1/13338 (2013.01); G02F 1/1343 (2013.01); G02F 1/1368 (2013.01)

(58) Field of Classification Search
CPC ... G02F 1/13338; G02F 1/1343; G02F 1/1368
(Continued)

(56) References Cited

U.S. PATENT DOCUMENTS

| 2010/0007632 A1 | 1/2010 | Yamazaki | |
|---|---|---|---|
| 2019/0252456 A1* | 8/2019 | Li | H01L 31/02164 |
| 2021/0042493 A1* | 2/2021 | Lius | G09G 3/2003 |

FOREIGN PATENT DOCUMENTS

| CN | 101315476 A | 12/2008 |
|---|---|---|
| CN | 106055162 A | 10/2016 |

(Continued)

OTHER PUBLICATIONS

International Search Report in International application No. PCT/CN2020/107153, dated Apr. 26, 2021.
(Continued)

Primary Examiner — Charles S Chang
(74) Attorney, Agent, or Firm — PV IP PC; Wei Te Chung; Zhigang Ma

(57) ABSTRACT

The embodiment of the present application discloses an array substrate, a display panel, and an electronic device. The array substrate includes a substrate and includes a control element; a first electrode is connected to the control element; a PIN diode is arranged on the first electrode, The PIN diode covers at least a part of the semiconductor layer of the control element and a part of the first electrode; a second conductive layer is arranged on the PIN diode, and the second conductive layer includes a second electrode.

20 Claims, 3 Drawing Sheets

(58) Field of Classification Search
USPC .......................................................... 349/12
See application file for complete search history.

(56) References Cited

FOREIGN PATENT DOCUMENTS

| | | |
|---|---|---|
| CN | 106200168 A | 12/2016 |
| CN | 107316884 A | 11/2017 |
| CN | 107342308 A | 11/2017 |
| CN | 107422560 A | 12/2017 |
| CN | 107480639 A | 12/2017 |
| CN | 108710237 A | 10/2018 |
| CN | 109065582 A | 12/2018 |
| CN | 111399265 A | 7/2020 |
| KR | 20190028194 A | 3/2019 |

OTHER PUBLICATIONS

Written Opinion of the International Searching Authority in International application No. PCT/CN2020/107153, dated Apr. 26, 2021.

* cited by examiner

ARRAY SUBSTRATE, DISPLAY PANEL, AND ELECTRONIC DEVICE

This application is a Notional Phase of PCT Patent Application No. PCT/CN2020/107153 having international filing date of Aug. 5, 2020, which claims priority to Chinese Patent Application with the application No. 202010715882.5 filed on Jul. 23, 2020 with the National Intellectual Property Administration, the disclosure of which is incorporated by reference in the present application in its entirety.

BACKGROUND OF INVENTION

Field of Invention

The present application relates to the field of display technology, in particular to an array substrate, a display panel, and an electronic device.

Description of Prior Art

Combining optical fingerprint technology with a display panel is one of the main development directions at present. Its principle is to use a difference in intensity of light reflected by valleys and ridges of a fingerprint into the sensing area of the display panel, to convert different light signals into electrical signals, and the electrical signals are captured by a chip to form a key fingerprint pattern, thus achieving the purpose of fingerprint recognition.

At present, the optical fingerprint technology used in organic light-emitting diodes is relatively widespread, but the optical fingerprint technology used in liquid crystal display panels is rare. Due to limitations of backlight, aperture ratio, and so on, the difficulty of integrating an optical fingerprint recognition function into the liquid crystal display panel has been increased, resulting in a decrease in accuracy of fingerprint recognition.

SUMMARY OF INVENTION

Embodiments of the present application provide an array substrate, a display panel, and an electronic device, which can improve the accuracy of fingerprint recognition.

An embodiment of the present application provides an array substrate, including:
 a substrate including a control element;
 a third metal layer disposed on the substrate and including a first electrode, wherein the first electrode is connected to the control element;
 a PIN diode disposed on the first electrode and including a first semiconductor layer and an intrinsic semiconductor layer, wherein the PIN diode covers at least part of a semiconductor layer of the control element and part of the first electrode; and
 a second conductive layer disposed on the PIN diode and including a second electrode, wherein the second electrode covers the PIN diode.

An embodiment of the present application also provides a display panel, which includes the above-mentioned array substrate.

An embodiment of the present application also provides an electronic device, which includes the above-mentioned display panel.

Embodiments of the present application include an array substrate, a display panel, and an electronic device, wherein the array substrate includes a substrate including a control element; a third metal layer disposed on the substrate and including a first electrode, wherein the first electrode is connected to the control element; a PIN diode disposed on the first electrode and including a first semiconductor layer and an intrinsic semiconductor layer, wherein the PIN diode covers at least part of a semiconductor layer of the control element and part of the first electrode; and a second conductive layer disposed on the PIN diode and including a second electrode, wherein the second electrode covers the PIN diode. Because a photosensitive sensor covers at least part of the semiconductor layer of the control element, an aperture ratio is increased, thereby improving the accuracy of fingerprint recognition.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

Figure 1:
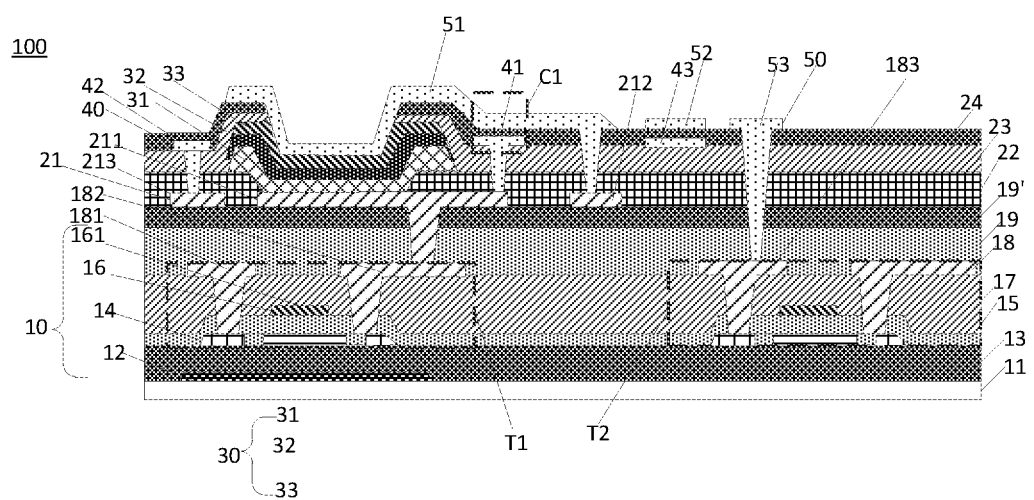
FIG. 1 is a schematic cross-sectional view of an array substrate provided by an embodiment of the present application.

The technical solutions in the embodiments of the present application will be clearly and completely described in the following Referring to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

In the description of this application, it should be understood that the terms "center", "longitudinal", "transverse", "length", "width", "thickness", "upper", "lower", "front", "Rear","left", "right", "vertical", "horizontal", "top", "bottom", "inside", "outside", "clockwise", "counterclockwise", and the like are based on the orientation or positional relationship shown in the drawings, and is merely for the convenience of describing the present invention and simplifying the description, rather than indicating or implying that the device or element referred to must have a specific orientation, structure and operation in a specific orientation, which should not be construed as limitations on the present invention. In addition, the terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, the meaning of "a plurality" is two or more, unless specifically defined otherwise.

In the description of this application, it should be noted that the terms "installation", "connected", and "connected" should be understood in a broad sense unless explicitly stated and limited otherwise. For example, it can be a fixed connection, a detachable connection, or an integral connection; it can also be a mechanical connection or an electrical connection; it can be a direct connection; or it can be an indirect connection through an intermediate medium; or it can be a communication between two components.

In the present invention, unless otherwise expressly stated and limited, the formation of a first feature over or under a second feature in the description that follows may include embodiments in which the first and second features are formed in direct contact, and may also include embodiments in which additional features may be formed between the first and second features, such that the first and second features may not be in direct contact. Moreover, the first feature "above", "over" and "on" the second feature includes the first feature directly above and above the second feature, or merely indicating that the first feature is at a level higher than the second feature. The first feature "below", "under" and "beneath" the second feature includes the first feature directly below and obliquely below the second feature, or merely the first feature has a level lower than the second feature.

The following disclosure provides many different embodiments or examples for realizing different structures of the present application. To simplify the disclosure of the present application, the components and settings of specific examples are described below. Of course, they are only examples and are not intended to limit the application. In addition, the present application may repeat reference numerals and/or reference letters in different examples. Such repetition is for the purpose of simplification and clarity, and does not indicate the relationship between the various embodiments and/or settings discussed. In addition, this application provides examples of various specific processes and materials, but those of ordinary skill in the art may be aware of the applications of other processes and/or the use of other materials.

Figure 2:
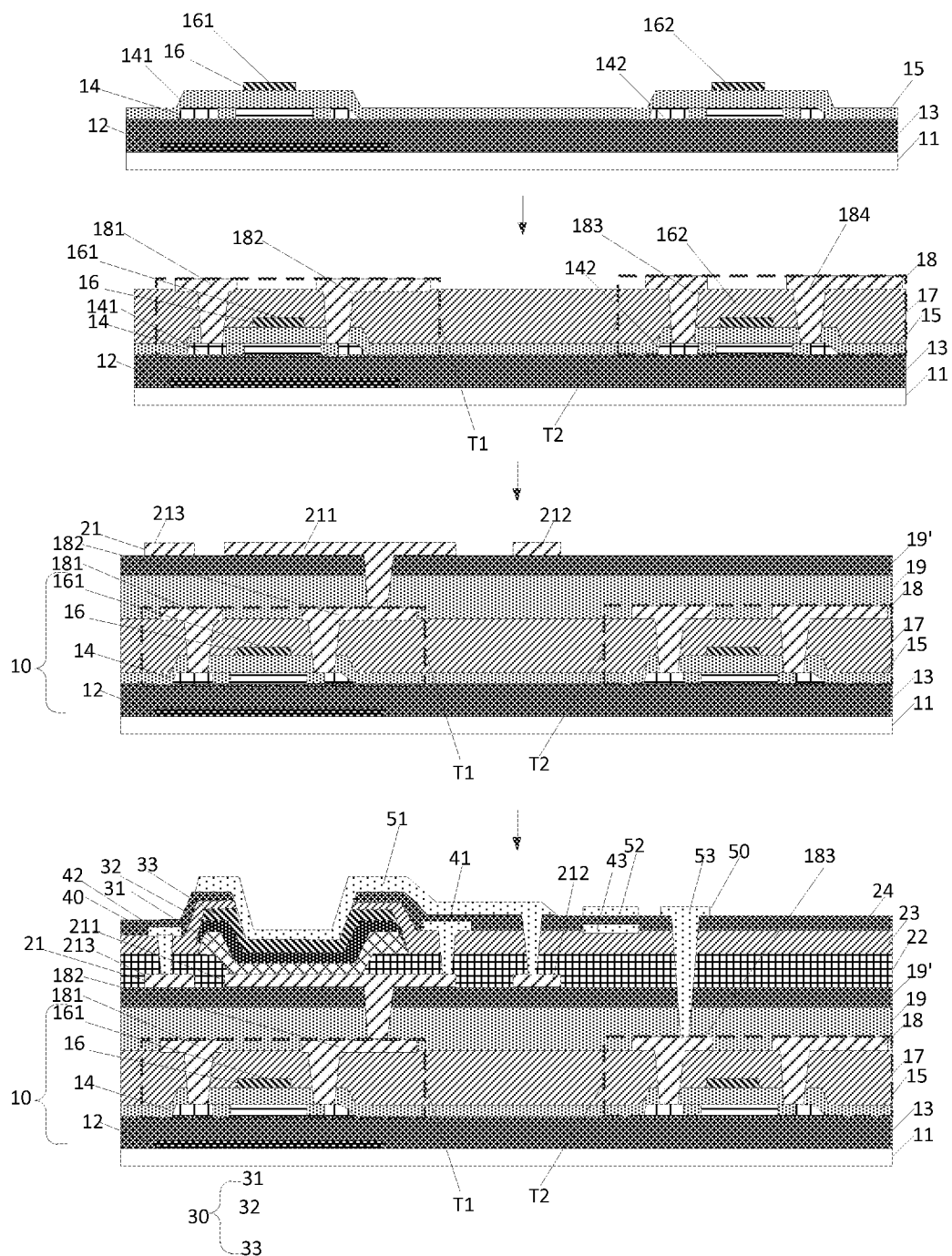
FIG. 2 is a flow chart of a process of manufacturing the array substrate shown in FIG. 1.
Figure 3:
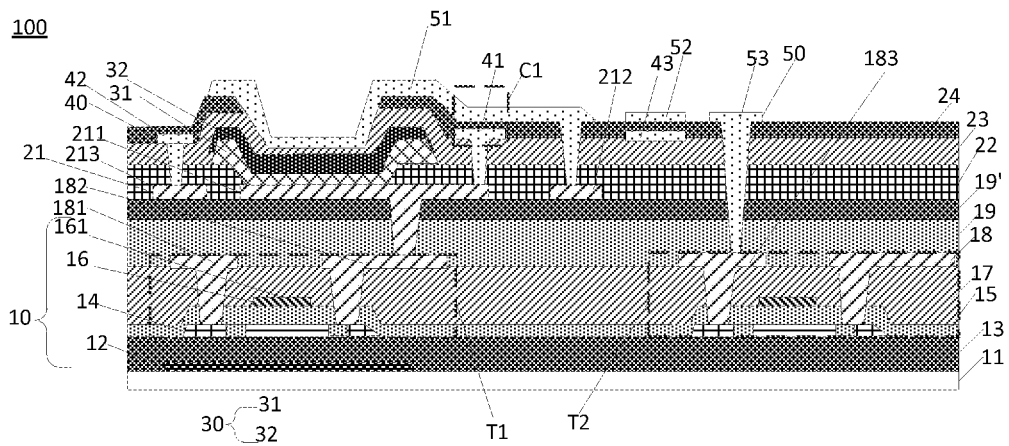
FIG. 3 is a schematic cross-sectional view of an array substrate provided by another embodiment of the present application.

Referring to FIG. 1 to FIG. 3, FIG. 1 is a schematic cross-sectional view of an array substrate provided by an embodiment of the present application.

As shown in FIG. 1, the array substrate 100 of this embodiment includes a substrate 10, a third metal layer 21, a PIN diode 30, and a second conductive layer 50.

The substrate 10 includes a control element T1, which is a thin film transistor. In an embodiment, the substrate 10 may include: a substrate 11, a first semiconductor layer 14, a first insulating layer 15, a first metal layer 16, and a second metal layer 18. In addition, the substrate 10 may further include at least one of a light-shielding layer 12, a buffer layer 13, a gate insulating layer 17, a planarization layer 19, and a passivation layer 19'.

The substrate 11 may be a glass substrate or a flexible substrate. Material of the substrate 11 includes glass, silicon dioxide, polyethylene, polypropylene, polystyrene, polylactic acid, polyethylene terephthalate, polyimide, polyurethane, or combinations thereof.

The light-shielding layer 12 is provided on the substrate 11, and the light-shielding layer 12 may be made of a metal material.

The buffer layer 13 is disposed on the light-shielding layer 12, and material of the buffer layer 13 includes but is not limited to silicon nitride or silicon oxide.

The first semiconductor layer 14 is disposed on the buffer layer 13. In a preferred embodiment, the first semiconductor layer 14 is made of a material including polysilicon. Referring to FIG. 2, the first semiconductor layer 14 may include a first semiconductor portion 141.

The first insulating layer 15 is disposed on the first semiconductor layer 14, and material of the first insulating layer 15 may include at least one of silicon nitride, silicon oxide, organic photoresist, or combinations thereof.

The first metal layer 16 is disposed on the first insulating layer 15, and the first metal layer 16 includes a first gate 161. Material of the first metal layer 16 may include at least one of copper, aluminum, titanium, or combinations thereof.

The gate insulating layer 17 is disposed on the first metal layer 16, and the material of the gate insulating layer 17 may include at least one of silicon nitride, silicon oxide, or combinations thereof.

The second metal layer 18 is provided on the gate insulating layer 17. The second metal layer 18 includes a first source 181 and a first drain 182, and material of the second metal layer 18 can be the same as that of the first metal layer 16.

The planarization layer 19 is provided on the second metal layer 18, and material of the planarization layer 19 may include at least one of silicon nitride, silicon oxide, organic photoresist, or combinations thereof. In a preferred embodiment, the material of the planarization layer 19 is an organic photoresist.

The passivation layer 19' is provided on the planarization layer 19, and material of the passivation layer 19' may include at least one of silicon nitride, silicon oxide, organic photoresist, or combinations thereof.

The third metal layer 21 is disposed on the passivation layer 19'; the third metal layer 21 includes a first electrode 211. The first electrode 211 is connected to the control element T1, and specifically, the first electrode 211 is connected to the first drain 182. Material of the third metal layer 21 may include, but not limited to, at least one of Ti/Al/Ti, Mo, Mo/Cu, Mo/Al/Mo, or combinations thereof. In one embodiment, in order to improve the sensitivity of the photosensitive sensor, an area of an orthographic projection of the first electrode 211 on the substrate 10 is greater than an area of an orthographic projection of the PIN diode 30 on the substrate 10, that is, the PIN diode 30 partially covers the first electrode 211. The PIN diode 30 covers at least a part of the first semiconductor portion 141. In a preferred embodiment, in order to further increase an aperture ratio, the PIN diode 30 may completely cover the first semiconductor portion 141.

The PIN diode 30 is disposed on the first electrode 211, and the PIN diode 30 includes a first semiconductor layer 31, an intrinsic semiconductor layer 32, and a second semiconductor layer 33. The intrinsic semiconductor layer 32 and the second semiconductor layer 33 are sequentially disposed on the first semiconductor layer 31. In one embodiment, material of the first semiconductor layer 31 includes N-type amorphous silicon (N+a-Si), material of the intrinsic semiconductor layer 32 includes amorphous silicon (a-Si), and material of the second semiconductor layer 33 includes P-type amorphous silicon (P+a-Si). In a preferred embodiment, the material of the semiconductor layer of the control element T1 includes polysilicon, and the material of the intrinsic semiconductor layer 32 includes amorphous silicon. Since the amorphous silicon can be made thicker, it facilitates light absorption, thereby being convenient to form a high-performance photosensitive sensor, thus improving the accuracy of fingerprint recognition.

The second conductive layer 50 is disposed on the PIN diode 30, and the second conductive layer 50 includes a second electrode 51. The second electrode 51 covers the PIN diode 30. In one embodiment, material of the second conductive layer 50 includes, but is not limited to, indium tin oxide. In one embodiment, in order to reduce the impedance of the first electrode, the array substrate 100 further includes: a first conductive layer 40, wherein the first conductive layer 40 is disposed between the PIN diode 30 and the second conductive layer 50. The first conductive layer 40 includes a first electrode plate 41, and the first electrode plate 41 is connected to the first electrode 211. Of course, it can be understood that, in other embodiments, the first conductive layer 40 may not include the first electrode plate. In one embodiment, material of the first conductive layer 40 includes, but is not limited to, indium tin oxide.

In one embodiment, in order to further improve the sensitivity of the photosensitive sensor, the second electrode 51 covers the first electrode 211 and the first electrode plate 41, that is, the area of the orthographic projection of the second electrode 51 on the substrate is greater than a sum of the area of the orthographic projection of the first electrode 211 on the substrate and the area of the orthographic projection of the first electrode plate 41 on the substrate. The array substrate 100 may further include a second electrode plate, and the second electrode plate is a part of the second electrode 51 corresponding to the first electrode plate 41 (not shown). The second electrode plate and the first electrode plate 41 form a storage capacitor C1.

In a preferred embodiment, in order to reduce a loss in voltage of the second electrode, the third metal layer 21 further includes a first metal part 212, and the second electrode 51 is connected to the first metal part 212. In addition, the first metal part 212 can be used as a voltage access point for the second electrode 51, so that the driver chip inputs a voltage to the second electrode 51 through the first metal part 212, thereby shortening a length of a connecting line between the second electrode 51 and the driver chip, reducing a loss in voltage, and thus improving the sensitivity of the photosensitive sensor. In addition, in an embodiment, the second electrode 51 may also cover a part or the whole of the first metal part 212.

In another embodiment, in order to further improve the integration of the array substrate and reduce the overall thickness, the third metal layer 21 further includes a common electrode 213, the first conductive layer 40 further includes touch electrode lines 42, the common electrode 213 is located corresponding to the touch electrode line 42, and the common electrode 213 is connected to the touch electrode line 42. In one embodiment, the material of the first conductive layer 30 includes, but is not limited to, indium tin oxide. In this embodiment, the touch electrode line 42 is also used as an access point for the common voltage.

In one embodiment, in order to simplify the manufacturing process and reduce production costs, the substrate 10 further includes a switching element T2, and the switching element T2 includes a third drain 183.

The second conductive layer 50 further includes a pixel electrode 53, and the pixel electrode 53 is connected to the drain 183 of the switching element T2.

In one embodiment, in order to simplify the manufacturing process and reduce production costs, the first conductive layer 40 further includes a first conductive plate 43, and the second conductive layer 50 further includes a second conductive plate 52, wherein the second conductive plate 52 and the first conductive plate 43 are located corresponding to each other to form a pixel capacitor.

In a preferred embodiment, the third drain 183 is located on the second metal layer 18. That is, the drain and source of the switching element T2 are prepared in the same level as the source and drain of the control element T1, respectively. In addition, the gate of the switching element T2 can be prepared in the same level as the gate of the control element T1. The semiconductor layer of the switching element can also be prepared in the same level as the semiconductor layer of the control element T1.

In addition, in an embodiment, the array substrate 100 may further include a second insulating layer 22, a third insulating layer 23, and a fourth insulating layer 24.

The second insulating layer 22 is disposed between the third metal layer 21 and the first semiconductor layer 31, and material of the second insulating layer 22 may include at least one of silicon nitride, silicon oxide, organic photoresist, or combinations thereof.

The third insulating layer 23 is disposed between the PIN diode 30 and the first conductive layer 40, and material of the third insulating layer 23 may also include at least one of silicon nitride, silicon oxide, organic photoresist, or combinations thereof.

The fourth insulating layer 24 is disposed between the first conductive layer 40 and the second conductive layer 50, and material of the fourth insulating layer 24 may also include at least one of silicon nitride, silicon oxide, organic photoresist, or combinations thereof.

The photosensitive sensor includes a PIN diode 30, a first electrode, and a second electrode. Since the photosensitive sensor is prepared on the control element T1, and the PIN diode 30 covers at least a part of the semiconductor layer of the control element, the photosensitive sensor also covers at least a part of the control element, such that the aperture ratio is increased, and the accuracy of fingerprint recognition is improved. In addition, the light absorption coefficient of the photosensitive layer of amorphous silicon is much better than that of polysilicon, thereby increasing the sensitivity of the photosensitive sensor.

As shown in FIG. 2, in one embodiment, the method of manufacturing the array substrate of the present application includes:

S101, preparing a light-shielding layer 12 on the substrate 11.

For example, the light-shielding layer 12 is patterned by exposure and etching, so that the light-shielding layer 12 shields the first semiconductor portion 141.

S102, preparing a buffer layer 13 and a first semiconductor layer 14 on the light-shielding layer 12, sequentially.

For example, material of the first semiconductor layer 14 includes polysilicon, and the first semiconductor layer 14 is subjected to exposure and etching to form the first semiconductor portion 141 and the second semiconductor portion 142. The first semiconductor portion 141 and the second semiconductor portion 142 are respectively doped with P ions to form N-type amorphous silicon (N+a-Si), so that the first semiconductor portion 141 and the second semiconductor portion 142 are easily in ohmic contact.

S103, depositing a first insulating layer 15 and a first metal layer 16 on the first semiconductor portion and the second semiconductor portion, sequentially.

For example, the first metal layer 16 is patterned to form the first gate 161 and the third gate 162, and then, the first semiconductor portion 141 and the second semiconductor portion 142 are respectively implanted with N-ion by a self-aligned process.

S104, depositing a gate insulating layer 17 on the first metal layer 16.

For example, in one embodiment, the gate insulating layer 17 can be a laminated structure of SiNx/SiOx. In one embodiment, rapid thermal annealing can be used for hydrogenation and activation, and then the gate insulating layer 17 can be subjected to exposure and etching. A connection hole for the source and drain is formed, and the connection hole is connected to the first semiconductor portion 141 or the second semiconductor portion 142.

S105, depositing a second metal layer in the connection hole and the gate insulating layer 17.

For example, the second metal layer 18 is patterned to form the first source 181 and the first drain 182, and the third drain 183 and the third source 184.

S106, forming a planarization layer 19 and a passivation layer 19' on the second metal layer 18, sequentially.

For example, the passivation layer 19' is provided with a via hole, the via hole penetrates the passivation layer 19' and the planarization layer 19, and the first electrode 211 is connected to the first drain 182 through the via hole.

S107, depositing a third metal layer 21 on the passivation layer 19'.

For example, the third metal layer 21 is patterned to form the first electrode 211, the first metal part 212, and the common electrode 213.

S108, depositing a second insulating layer 22 on the third metal layer 21.

S109, sequentially depositing a first semiconductor layer 31, an intrinsic semiconductor layer 32, and a second semiconductor layer 33 on the second insulating layer 22, which are then patterned. In one embodiment, material of the first semiconductor layer 31 includes N-type amorphous silicon (N+a-Si), material of the intrinsic semiconductor layer 32 includes amorphous silicon (a-Si), and material of the second semiconductor layer 33 includes P-type amorphous silicon (P+a-Si).

S110. sequentially forming a third insulating layer 23 and a first conductive layer 40 on the second semiconductor layer 33, and the first conductive layer 40 is patterned to form a first electrode plate 41, a touch electrode line 42, and a first conductive plate 43.

A first connection hole between the touch electrode line 42 and the common electrode 213 and a second connection hole between the first electrode plate 41 and the first electrode 211 are formed in the third insulating layer 23, and both of these connection holes penetrate the third insulating layer 23 and the second insulating layer 22.

S111, depositing a fourth insulating layer 24 and a second conductive layer 50 on the first conductive layer 40, sequentially.

For example, the fourth insulating layer 24 is provided with a first via hole and a second via hole, and the first via hole is used to connect the second electrode 51 to the first metal part 212.

The second via hole is used to connect the pixel electrode 53 to the third drain 183.

The second conductive layer 50 is patterned to form the second electrode 51, the pixel electrode 51, and the second conductive plate 52.

The method of manufacturing the array substrate of this embodiment includes all the technical solutions of the above-mentioned array substrate, and therefore can achieve all the above-mentioned technical effects, which will not be repeated herein for brevity.

In other embodiments, as shown in FIG. 3, the PIN diode 30 may not include the second semiconductor layer 33, that is, the PIN diode 30 includes the first semiconductor layer 31 and the intrinsic semiconductor layer 32.

It can be understood that each of FIG. 1 to FIG. 3 only show a schematic structural diagram of one of the embodiments, but the present invention is not limited thereto.

Figure 4:
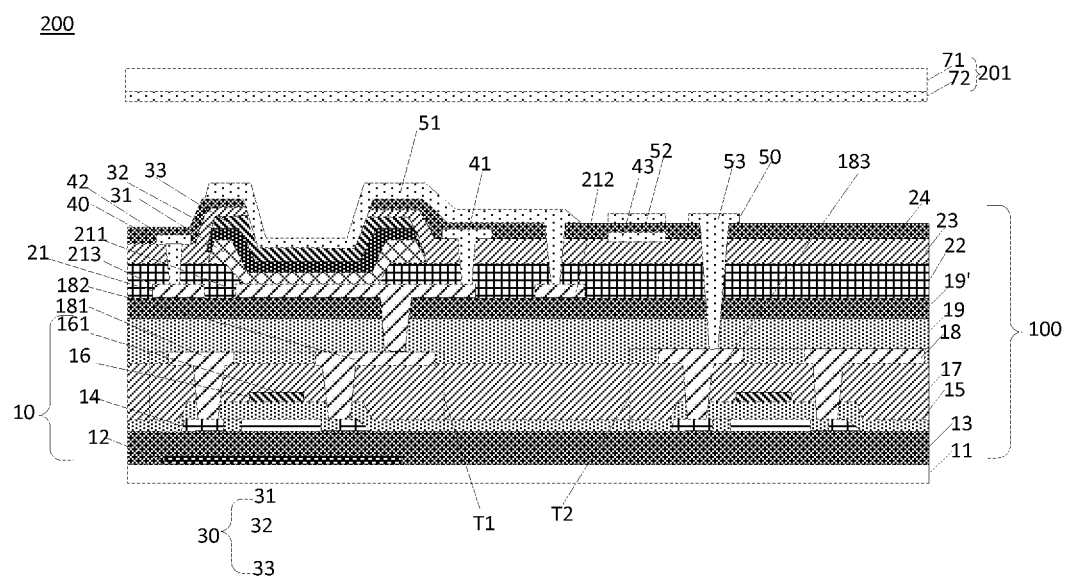
FIG. 4 is a schematic structural diagram of a display panel provided by an embodiment of the present application.

As shown in FIG. 4, this embodiment also provides a display panel 200, which includes any of the above-mentioned array substrates 100. In addition, the display panel 200 may further include a second substrate 201, which is disposed opposite to the array substrate 100. The display panel 200 may be a liquid crystal display panel. A liquid crystal layer (not shown) is also disposed between the array substrate 100 and the second substrate 201. In addition, a sealant may be disposed between the array substrate 100 and the second substrate 201 and configured to bond the array substrate 100 and the second substrate 201. In an embodiment, the second substrate 201 may include a second substrate 71 and a second electrode 72. In another embodiment, the second substrate 201 may be a color filter substrate, that is, the second substrate 201 may further include a color filter layer. It can be understood that the structure of the second substrate 201 is not limited to this.

Figure 5:
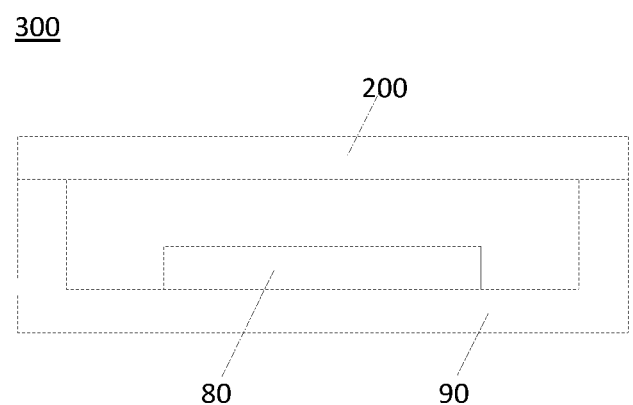
FIG. 5 is a schematic structural diagram of an electronic device provided by an embodiment of the present application.

Referring to FIG. 5, which is a schematic structural diagram of an electronic device provided by an embodiment of the present application.

The electronic device 300 may include a display panel 200, a control circuit 80, and a housing 90. It should be noted that the electronic device 300 shown in FIG. 5 is not limited to the above content, and may also include other components, such as a camera, an antenna structure, a fingerprint unlocking module, and the like.

The display panel 200 is disposed on the housing 90.

In some embodiments, the display panel 200 may be fixed to the housing 90, and the display panel 200 and the housing 90 form a closed space to accommodate components such as the control circuit 80.

In some embodiments, the housing 90 may be made of a flexible material, such as a plastic housing or a silicone housing.

The control circuit 80 is installed in the housing 90, the control circuit 80 can be the main board of the electronic device 300, and one, two, or more of the functional components, such as a battery, an antenna structure, a microphone, a speaker, a headphone interface, a universal serial bus interface, a camera, a distance sensor, an ambient light sensor, a receiver, and a processor, can be integrated on the control circuit 80.

The display panel 200 is installed in the housing 90, and meanwhile, the display panel 200 is electrically connected to the control circuit 80 to form a display surface of the electronic device 300. The display panel 200 may include a display area and a non-display area. The display area can be used to display an image of the electronic device 300 or for a user to perform touch manipulation. The non-display area can be used to set various functional components.

The electronic device includes, but is not limited to, a mobile phone, a tablet computer, a computer monitor, a game console, a television, a display screen, a wearable device, and other household appliances or household appliances with display functions.

Embodiments of the present application include an array substrate, a display panel, and an electronic device, wherein the array substrate includes a substrate including a control element; a third metal layer disposed on the substrate and including a first electrode, wherein the first electrode is connected to the control element; a PIN diode disposed on the first electrode and including a first semiconductor layer and an intrinsic semiconductor layer, wherein the PIN diode covers at least part of a semiconductor layer of the control element and part of the first electrode; and a second conductive layer disposed on the PIN diode and including a second electrode, wherein the second electrode covers the PIN diode. Because a photosensitive sensor covers at least part of the semiconductor layer of the control element, an aperture ratio is increased, thereby improving the accuracy of fingerprint recognition.

The array substrate, display panel, and electronic device provided by the embodiments of the present application are described in detail above. Specific examples are used to explain the principle and implementation of the present application. The descriptions of the above embodiments are only used to help understand the present application. Also, for those skilled in the art, according to the ideas of the present application, there will be changes in the specific implementation and application scope. In summary, the content of this specification should not be construed as limiting the present application.

The invention claimed is:

1. An array substrate, comprising:
 a substrate comprising a control element;
 a third metal layer disposed on the substrate and comprising a first electrode, wherein the first electrode is connected to the control element;
 a PIN diode disposed on the first electrode, connected to the first electrode, and comprising a first semiconductor layer and an intrinsic semiconductor layer, wherein the PIN diode covers at least part of a semiconductor layer of the control element and part of the first electrode;
 a first conductive layer disposed on the PIN diode and comprising a first conductive plate; and
 a second conductive layer disposed on the PIN diode and located on a side of first conductive layer away from the PIN diode, wherein the second conductive layer comprises a second electrode and a second conductive plate, the second electrode covers and is connected to the PIN diode, and the second conductive plate is disposed corresponding to the first conductive plate.

2. The array substrate according to claim 1, wherein the third metal layer further comprises a first metal part; and
 the second electrode is connected to the first metal part.

3. The array substrate according to claim 1, wherein the first conductive layer comprises a first electrode plate spaced apart from the first conductive plate, and the first electrode plate is connected to the first electrode.

4. The array substrate according to claim 3, wherein the second electrode covers the first electrode and the first electrode plate.

5. The array substrate according to claim 4, wherein the array substrate further comprises a second electrode plate, wherein the second electrode plate is a part of the second electrode corresponding to the first electrode plate.

6. The array substrate according to claim 3, wherein the third metal layer further comprises a common electrode, the first conductive layer further comprises a touch electrode line, the common electrode is disposed corresponding to the touch electrode line, and the common electrode is connected to the touch electrode line.

7. The array substrate according to claim 1, wherein an area of an orthographic projection of the first electrode on the substrate is greater than an area of an orthographic projection of the PIN diode on the substrate.

8. The array substrate according to claim 1, wherein the substrate further comprises a switching element;
 the second conductive layer further comprises a pixel electrode; and
 the pixel electrode is connected to a drain of the switching element.

9. The array substrate according to claim 1, wherein the semiconductor layer of the control element is made of a material comprising polysilicon, and the intrinsic semiconductor layer is made of a material comprising amorphous silicon.

10. The array substrate according to claim 1, wherein the PIN diode further comprises a second semiconductor layer, and the second semiconductor layer is disposed on the intrinsic semiconductor layer.

11. The array substrate according to claim 1, wherein the third metal layer further comprises a first metal part connected to the second electrode and configured to be a voltage access point of the second electrode, the first metal part is spaced apart from the first electrode in a direction parallel to the substrate, and an orthographic projection of the first metal part on the substrate partially overlaps with an orthographic projection of the second electrode on the substrate; and
 wherein the first conductive layer further comprises a first electrode plate connected to the first electrode, in the direction parallel to the substrate, the first conductive plate is located at a side of the first metal part away from the first electrode plate, the second conductive plate is located at a side of the second electrode away from the PIN diode, and an orthographic projection of the first conductive plate on the substrate overlaps at least partially with an orthographic projection of the second conductive plate on the substrate.

12. A display panel, comprising an array substrate, wherein the array substrate comprises:
 a substrate comprising a control element;
 a third metal layer disposed on the substrate and comprising a first electrode, wherein the first electrode is connected to the control element;
 a PIN diode disposed on the first electrode, connected to the first electrode, and comprising a first semiconductor layer and an intrinsic semiconductor layer, wherein the PIN diode covers at least part of a semiconductor layer of the control element and part of the first electrode;
 a first conductive layer disposed on the PIN diode and comprising a first conductive plate; and
 a second conductive layer disposed on the PIN diode and located on a side of first conductive layer away from the PIN diode, wherein the second conductive layer comprises a second electrode and a second conductive plate, the second electrode covers and is connected to the PIN diode, and the second conductive plate is disposed corresponding to the first conductive plate.

13. The display panel according to claim 12, wherein the third metal layer further comprises a first metal part; and
 the second electrode is connected to the first metal part.

14. The display panel according to claim 12, wherein the first conductive layer comprises a first electrode plate spaced apart from the first conductive plate, and the first electrode plate is connected to the first electrode.

15. The display panel according to claim 14, wherein the second electrode covers the first electrode and the first electrode plate.

16. The display panel according to claim 15, wherein the array substrate further comprises a second electrode plate, wherein the second electrode plate is a part of the second electrode corresponding to the first electrode plate.

17. The display panel according to claim 14, wherein the third metal layer further comprises a common electrode, the first conductive layer further comprises a touch electrode line, the common electrode is disposed corresponding to the touch electrode line, and the common electrode is connected to the touch electrode line.

18. The display panel according to claim 12, wherein an area of an orthographic projection of the first electrode on the substrate is greater than an area of an orthographic projection of the PIN diode on the substrate.

19. The display panel according to claim 12, wherein the semiconductor layer of the control element is made of a material comprising polysilicon, and the intrinsic semiconductor layer is made of a material comprising amorphous silicon.

20. An electronic device, comprising a display panel, wherein the display panel comprises an array substrate, and the array substrate comprises:
- a substrate comprising a control element;
- a third metal layer disposed on the substrate and comprising a first electrode, wherein the first electrode is connected to the control element;
- a PIN diode disposed on the first electrode, connected to the first electrode, and comprising a first semiconductor layer and an intrinsic semiconductor layer, wherein the PIN diode covers at least part of a semiconductor layer of the control element and part of the first electrode;
- a first conductive layer disposed on the PIN diode and comprising a first conductive plate; and
- a second conductive layer disposed on the PIN diode and located on a side of first conductive layer away from the PIN diode, wherein the second conductive layer comprises a second electrode and a second conductive plate, the second electrode covers and is connected to the PIN diode, and the second conductive plate is disposed corresponding to the first conductive plate.

* * * * *